United States Patent Office 3,267,077
Patented August 16, 1966

3,267,077
CROSS-LINKED URETHANES AND UREAS
Erwin Windemuth, Leverkusen, Hanswilli von Brachel, Cologne-Sulz, and Georg von Finck, Leverkusen, Germany, assignors to Farbenfabriken Bayer Aktiengesellschaft, Leverkusen, Germany, a German corporation
No Drawing. Filed June 15, 1960, Ser. No. 36,135
Claims priority, application Germany, June 19, 1959, F 28,733
1 Claim. (Cl. 260—75)

This invention relates to an improved process for the preparation of poly-N,N-ethylene ureas and improved plastics obtained therefrom including the preparation of coating compositions having improved properties.

It has been proposed heretofore to prepare plastics from monomeric organic polyisocyanates and alkylene imines by mixing said polyisocyanate and said imine to obtain a polyethylene urea and subsequently converting the same to a cross-linked plastic by heating either alone or in conjunction with an acid catalyst. The disadvantage of this process is that the conversion to the cross-linked product is difficult to control because of the high reactivity of polyethylene ureas obtained from a monomeric organic polyisocyanate and an alkylene imine. Moreover, the final products cannot be adapted to a variety of uses because of the limited number and the limited nature of the starting materials used in the preparation of the polyethylene ureas.

It is, therefore, an object of this invention to provide improved poly-N,N-ethylene ureas and improved processes for the preparation thereof. Another object of this invention is to provide improved cross-linked insoluble nitrogenous plastics. Still another object of this invention is to provide an improved process for the production of an antistatic coating composition. Another object of this invention is to provide an improved method of coating textiles with an antistatic coating which is resistant to repeated washing. Still another object of this invention is to provide an improved process for the production of substantially nonporous cross-linked nitrogenous plastics.

The foregoing objects and others which will become apparent from the following description are accomplished in accordance with the invention, generally speaking, by providing poly-N,N-ethylene ureas obtained from a 1,2-alkylene imine and a urethane or urea having at least two free —NCO groups and nitrogenous plastics obtained therefrom. The invention, therefore, contemplates an improved process for the preparation of poly-N,N-ethylene ureas which are suitable for conversion by heating alone or in conjunction with an acid anhydride to form nitrogenous cross-linked insoluble plastics. The plastics of the invention are improved over those obtained from monomeric organic polyisocyanates and alkylene imines because the cross-linking reaction can be controlled to such an extent that it may even be used for the coating of textiles and the like. Furthermore, the solidification of the new poly-N,N-ethylene ureas can be controlled to such an extent that they may be used in the production of hard substantially nonporous plastic articles prepared by molding or casting processes. It can be seen, therefore, that the invention provides a process for the preparation of nitrogenous plastics which have improved properties over those of the heretofore known plastics obtained from monomeric organic polyisocyanates and alkylene imines. In accordance with a preferred embodiment of this invention an organic compound containing at least two active hydrogen containing groups which are preferably hydroxyl groups and/or amino groups are reacted with an excess of an aromatic polyisocyanate in a first step to obtain a polyurethane polymer having free —NCO groups. This polymer is then reacted in a second step with an alkylene imine and preferably a 1,2-alkylene imine to obtain a poly-N,N-ethylene urea which is suitable for further reaction either alone or together with an organic acid anhydride to prepare an improved cross-linked plastic.

Any suitable organic compound containing at least one active hydrogen containing group may be used in accordance with the process of the present invention for reaction with an excess of an organic polyisocyanate to prepare the aforementioned urethane or urea having at least two free —NCO groups. Suitable compounds of this type include polyhydric alcohols, polyhydric phenols, polyhydric polyalkylene ethers, polyacetals, polyhydric polythioethers, hydroxyl polyesters, polyamines, monohydric alcohols, monoamines and the like. While the invention contemplates low molecular weight alcohols and amines including ethylene glycol and ethylene diamine, it is preferred to employ organic compounds which have a molecular weight of at least about 150 and best results are obtained when compounds are used which have a molecular weight between about 150 and about 2000 and which have an hydroxyl number within the range of from about 56 to about 750 and acid numbers, where they are applicable, below about five and most preferably below one. Any suitable polyhydric alcohol may be used such as, for example, ethylene glycol, propylene glycol, 1,4-butane diol, 1,3-butane diol, 1,6-hexane diol, octadec-9,10-ene-1,12-diol, thiodiglycol, 2,2-dimethyl propane-1,3-diol, 1,18-octadecane diol, 2-ethyl hexane-1,3-diol, 2,4-dimethyl-2-propyl heptane-1,3-diol, 2-butene-1,4-diol, 2-butine-1,4-diol, diethylene glycol, triethylene glycol, glycerine, hexane-1,2-6-triol, triethanolamine, pentaerythritol, quinitol, sorbitol, hexahydropyrocatechol, 4,4'-dihydroxydicyclohexyl dimethylmethane, N-methyl diethanolamine and the like.

Any suitable polyhydric phenol may be used such as, for example, o, m and p-dihydroxy benzene, 1,3,5-trihydroxy benzene, 4,4'-dihydroxydiphenyl, 6,6'-dihydroxy-3,3'-diethyldiphenyl, 2,2'- or 4,4'-dihydroxydibenzyl, 4,4'-dihydroxydiphenyldimethylmethane, p,p' - dihydroxydiphenylmethane, 4,4' - dihydroxydiphenyl - 1,1 - isobutane, polymethylene-bis-phenols of the type

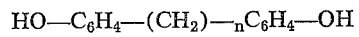
HO—C$_6$H$_4$—(CH$_2$)—$_n$C$_6$H$_4$—OH in which $n$ can be a whole number up to 18, trinuclear bisphenols in which the nuclei are connected to one another by —CH$_2$—CH$_2$— groups, hydroquinone ethylene diethers, dihydroxybenzophenones of the formula

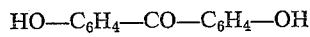
HO—C$_6$H$_4$—CO—C$_6$H$_4$—OH bisphenol sulphides of the formula

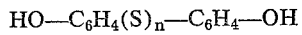
HO—C$_6$H$_4$(S)$_n$—C$_6$H$_4$—OH in which $n$ can be a whole number up to 3 and the benzene nuclei can be substituted, 4,4'-dihydroxydiphenyl sulphone, di-(hydroxyl-p-tertiary-butyl-benzyl)-cyclohexylamine, tetra-(hydroxybenzyl)-alkylene diamines such as tetra-(hydroxydimethylbenzyl)-ethylene diamine and the like.

Any suitable polyhydric polyalkylene ether may be used such as are obtained for example, by the condensation of an alkylene oxide either alone or together with one of the aforementioned polyhydric alcohols as well as those obtained from tetrahydrofuran and epihalohydrins such as epichlorohydrin. Any suitable alkylene oxide may be used, such as, for example, ethylene oxide, propylene oxide, butylene oxide, amylene oxide, styrene oxide and the like. Of course, mixtures of these alkylene oxides may also be used. It is also possible to prepare polyhydric polyalkylene ethers suitable for use in accordance with the present invention by reacting said alkylene oxides with aliphatic, hydroaromatic and/or aromatic monofunctional or polyfunctional amines and/or amino alcohols such as, for example, ethanolamine, diethanolamine, ethylene diamine, cyclohexylamine, aniline and the like as well as polycarboxylic acids such as adipic acid, hydroxy carboxylic acids such as ricinoleic acid, polycarboxylic acid amines such as, for example, pyridine 2,3-dicarboxylic acid and/or polycarboxylic acid sulphamides such as succinic acid disulphoamide.

Any suitable polyacetal may be used such as those disclosed in German Patents 1,039,744 and 1,045,095 which may be obtained, for example, by reaction of any suitable polyhydric alcohol as more particularly set forth above with any suitable aldehyde and preferably formaldehyde.

Any suitable polyhydric polythioether may be used such as is obtained, for example, from thiodiglycol or other thioglycol either alone or in conjunction with polyhydric alcohols, examples for which are set forth above.

Any suitable polyester may be used but it is preferred to employ alcoholic hydroxyl terminated polyesters obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylene-tetracarboxylic acid and the like. Any suitable polyhydric alcohol including those more specifically disclosed above as well as alkanolamines such as, for example, ethanolamine may be used. Also, polyhydroxy carboxylic acids, amino carboxylic acids, lactams and/or lactones may be used in the preparation of the polyesters including ricinoleic acid, hydroxystearic acid as well as dimerized and trimerized unsaturated fatty acids. Of course, the term "polyester" includes polyester amides which may be obtained by including some amine such as ethylene diamine or one of the above-mentioned amino carboxylic acids in the reaction mixture.

Any suitable polyamine may be used such as, for example, ethylene diamine, aniline, p-aminoaniline, and polymers of the type set forth above which have terminal primary or secondary amino groups.

Organic compounds which contain only one active hydrogen containing group should only be used in conjunction with organic polyisocyanates which contain at least three isocyanate groups. Compounds of this type include for example, the monohydric alcohols which have the general formula R—OH in which R may be a linear, branched, saturated or unsaturated alkyl, cycloalkyl, aralkyl or aryl group and which may also contain hetero atoms or other substituents such as, for example, ethyl alcohol, 2-methyl-butane-4-ol, allyl alcohol, octadec-9-ene-1-ol, fatty alcohols with 12 to 20 carbon atoms, propargyl alcohol, hexanediol-monomethyl ether, ethylene glycol monoacetate, 1,2-epoxy-3-oxypropane, cyclohexanol, benzyl alcohol, phenylethyl alcohol, cinnamyl alcohol, phenol, cresols, xylenols, p-allyl phenol and the like. In addition, monofunctional alcohols which are obtained by addition of one or more mols of an alkylene oxide such as ethylene oxide, propylene oxide, 1,2- or 2,3-butylene oxide, epichlorohydrin, styrene oxide and the like to the aforesaid alcohols or to mercaptans, such as ethyl mercaptan and the like, monocarboxylic acids, such as acetic acid, phenyl acetic acid and the like, carboxylic acid amides, such as acetamide, benzamide and the like, secondary aliphatic, araliphatic and aromatic amines, such as N,N-dimethyl amine, N-phenyl-N-methyl amine, N,N-diphenyl amine, N,N-dibenzyl amine and the like and sulfonamides such as benzenesulfonamide and the like may be used.

Any suitable monofunctional and/or polyfunctional isocyanate can be used for the production of the poly-N,N-ethylene ureas. Poly-N,N-ethylene ureas, i.e., those with more than one N,N-ethylene urea group, are necessary to obtain a cross-linked insoluble product. Therefore, monofunctional isocyanates can only be used for modification purposes. For example, one mol of a trihydric alcohol and one mol of a monoisocyanate, may be reacted to obtain a urethane which is suitable for further reaction with polyisocyanates and thereafter with 1,2-alkylene imines. Valuable modifications can be produced by varying the organic radical, R, of the monoisocyanate, R—NCO. Any suitable organic radical may be R in the formula, R—NCO, including aliphatic, araliphatic, alicyclic, aromatic and heterocyclic radicals such as, for example, methyl, ethyl, allyl, n-butyl, tertiary-butyl, dodecyl, octadecyl, oleyl, cyclohexyl, 1-chloro-6-hexyl, 1-cyano-3-propyl, benzyl, tolyl, phenyl, furfuryl and the like. In addition, isocyanatoacetic acid ethyl esters, isocyanatocaproic acid esters, ethyl ether propyl isocyanate, n-butylglycol ether propyl isocyanate, phenyl-o-, m- and p-toluyl isocyanates, benzyl, phenylethyl, diphenylmethane-4,3,4,6-trichlorophenyl, nitrophenyl, chlorophenyl, m-cyanophenyl isocyanates, as well as isocyanates of naphthalene or polynuclear ring systems such as 1-naphthyl or 2-naphthyl or phenanthryl-3-isocyanates may be used.

The following are mentioned as examples of suitable polyisocyanates, which can either be used alone or in any desired mixture: Aliphatic diisocyanates, of the general formula OCN—R—NCO, wherein R represents a linear or branched, saturated or unsaturated alkylene radical, which can also be interrupted by hetero atoms such as oxygen or sulphur. Examples of these are tetra- or hexa-methylene diisocyanates, butene-diisocyanates, dithiodiethyl or thiodipropyl diisocyanates, 2,2-dimethylpentane diisocyanate, omega,omega'-dipropyl-ether diisocyanate, 1,4-butylene glycol dipropyl ether diisocyanate and the like. Aliphatic diisocyanates with built-in ring systems such as, for example, omega,omega'-diisocyanate-1,3-dimethyl benzene, omega,omega'-diisocyanate-1,4-dimethyl-cyclohexane, omega,omega'-diisocyanate - 1,4 - diethyl benzene and the like.

Hydroaromatic diisocyanates may be the organic polyisocyanate such as cyclohexane-1,3- or cyclohexane-1,4-diisocyanates, 1-methyl-cyclohexane-2,4-diisocyanates, dicyclohexyl methane-4,4'-diisocyanate, dicyclohexyl dimethyl methane-4,4-diisocyanate, 2,2'-dimethyl-dicyclohexyl methane-4,4'-diisocyanate.

Aromatic-aliphatic or aromatic-hydroaromatic diisocyanates may be the organic polyisocyanate such as 4-phenyl isocyanate-β-ethyl isocyanate, hexahydrobenzidine-4,4'- or hexahydrodiphenyl methane-4,4'-diisocyanates, 3-phenyl isocyanate-α-ethyl isocyanate.

Diisocyanates of benzene and its homologues such as 1,3- or 1,4-phenylene diisocyanates, 1-alkyl benzene-2,4-, 2,6-, 2,5-, 3,5-diisocyanates, more especially toluylene-2,4- and 2,6-diisocyanates, mixtures of the two isomers for example in the ratio 65:35 or 80:20, 1-methyl-3,5-diethyl-benzene-2,4-diisocyanate, diisopropyl benzene-diisocyanate and the like may be used.

Diisocyanates of substitution products of benzene may be used, such as, for example, 1-chlorobenzene-2,4-diisocyanate, dichlorobenzene-diisocyanates, 1-nitrobenzene-2,4 - diisocyanate, 1 - methoxy-benzene - 2,4 - diisocyanate, azobenzene-4,4'-diisocyanate, diphenylether-4,4'-diisocyanate and the like. Diisocyanates of naphthalene such as naphthalene-1,4-, 1,5- and 2,6-diisocyanates and the like may be used. Diisocyanates of biphenyl or deriving from diphenylmethane, such as, for example, benzidine diisocyanate, 3,3'-dimethyldiphenyl-4,4'-diisocyanate, diphenylmethane - 4,4' - diisocyanate, diphenyl - dimethyl-methane-diisocyanates, benzophenone - 3,3' - diisocyanate and the like may be used. In addition, diisocyanates of polynuclear ring systems such as 1,5-naphthalene diisocyanate and the like sulphur-containing aromatic diisocyanates, such as p,p'-diisocyanato-diphenyl sulfide, triisocyanates and tetraisocyanates, such as 1-methyl-benzene-2,4,6-triisocyanate, triphenyl methane-4,4',4''-triisocyanate, 2,2',4,4',-diphenylmethane tetraisocyanate and the like.

Furthermore, polyisocyanates of higher molecular weight and containing urethane groups, for example a triisocyanate obtained by reaction of one mol of trimethylol propane and three mols of toluylene-2,4-diisocyanate and having an —NCO content of about 19.2 percent, and isocyanates or isocyanate combinations partially formed in accordance with a perhydrotriazine ring cyclization, for example according to German Patent 951,168, are suitable as polyisocyanates in accordance with the present invention.

Water may be reacted with an organic polyisocyanate to obtain urea polyisocyanates suitable for further reaction with a 1,2-alkylene imine. Another class of suitable polyisocyanates for further reaction with a 1,2-alkylene imine are the biuret isocyanates described in French Patent 1,228,477.

In the preparation of urethane or urea compounds having free —NCO groups, an excess of the organic isocyanate is used. It is necessary to use an over-all proportion of —NCO groups to reactive hydrogen atom groups which is greater than 1:1. Preferably an amount of organic polyisocyanate is used which is at least sufficient to provide an —NCO to active hydrogen containing group ratio of two or more so that reaction with all of the active hydrogen containing groups will take place and leave urethanes which contain free —NCO groups. The temperature at which the reaction between the organic isocyanate and the active hydrogen containing compound is carried out may be varied over a wide range but it is preferred to carry the reaction out at a moderate elevated temperature between about 50° C. and about 150° C. The course of the reaction can be followed titrametrically.

In some cases and particularly where solid components are used to form the urethane polymers having free —NCO groups a solvent for the reaction mixture is required. These solvents should be substantially anhydrous and should contain no hydrogen atoms which will react with an isocyanate. Any suitable solvent of this type may be used such as, for example, acetone, ethylacetate, butylacetate, ethylene glycol monoethylether acetate, halogenated aliphatic or aromatic solvents such as, for example, methylene chloride, o-dichlorobenzene as well as saturated and unsaturated hydrocarbons including for example xylene, toluene, benzene, benzine, heptane, hexane and the like.

It is seldom necessary to use accelerators for the preparation of the urethane polymers but where they are required, any suitable accelerator may be used such as, for example, tertiary amines, such as, N-ethyl morpholine and the like as well as metal compounds which may be either organic or inorganic such as, for example, stannous chloride and dibutyl-tin-di-2-ethyl hexoate and the like.

The urethanes containing free —NCO groups are then reacted with 1,2-alkylene imines to prepare the novel poly-N,N-ethylene ureas. Any suitable 1,2-alkylene imine may be used including those which are represented by the following general formula

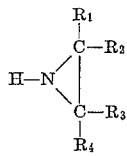

wherein $R_1$, $R_2$, $R_3$ and $R_4$ may be the same or different and may be hydrogen, aliphatic, aromatic, aliphatic-aromatic or heterocyclic radicals including alkyl, aryl, alkaryl, aralkyl, alicyclic and heterocyclic radicals such as, for example, methyl, ethyl, propyl, butyl, amyl, hexyl, heptyl, octyl and the like including eicosyl and the like; phenyl, tolyl, xylyl, naphthyl and the like, cyclopentyl, cyclohexyl and the like; benzyl and the like; furfuryl and the like. Thus, any suitable 1,2-alkylene imine may be used such as, for example, ethylene imine, 2-methyl-ethylene imine, 2-ethyl ethylene-imine, 2,2-dimethyl ethylene imine, 2,3-dimethyl, 2,2,3-trimethyl and 2,2-dimethyl-3-n-propyl ethylene imines, 1,2-iminocyclohexane, 2-phenyl-ethylene imine, 2,3-diphenyl ethylene imine, 2-ethyl-2-phenyl ethylene imine, 2-ethyl-2-phenyl-3-methylethylene imine, 2-propyl-2-phenyl-ethylene imine and the like.

The reaction between the urethane having a free —NCO group and the 1,2-alkylene imines to produce a poly-N,N-ethylene urea proceeds exothermically and is generally carried out at temperautres below about 50° C. It is frequently advantageous to use inert organic solvents of the type set forth above for solvation of the reaction between an organic polyisocyanate and an active hydrogen containing compound at this stage in the process. The quantity of the 1,2-alkylene imines to be used for reaction with the urethane polymer having free —NCO groups is based on the free —NCO content of said urethane polymer. Usually at least one mol of the 1,2-alkylene imine is preferred for reaction with each —NCO group in said urethane polymer so that all of the —NCO groups are converted to N,N-ethylene urea groups. In some cases, it is advantageous to depart from this rule and use a content of 1,2-alkylene imine which is insufficient to react with all of the —NCO groups. In this event a poly-N,N-ethylene urea is obtained which has —NCO groups available for further reaction in the production of a cross-linked plastic. The 1,2-alkylene imine is preferably added to the urethane polymer containing free —NCO groups dropwise while cooling the reaction mixture. After all of the 1,2-alkylene imine has been added, it is only necessary to stir the mixture for a short time in order to complete the reaction.

The poly-N,N-ethylene ureas obtained in this way are immediately suitable for conversion into the cross-linked nitrogeneous plastics of the invention. The temperatures at which the conversion takes place may be varied over a wide range. It is preferred to carry out the conversion at a temperature below about 250° C. because higher temperatures cause deterioration of the resulting product. The conversion to a cross-linked plastic may also be carried out at room temperature if the N,N-ethylene urea is mixed with an acid reaction accelerator such as, for example, phosphoric acid, hydrochloric acid, sulphur dioxide and/or an acid salt such as, for example, sodium acetate and the like. The temperature at which the poly-N,N-ethylene urea is cross-linked to produce a nitrogenous plastic is dependent to a large degree on the components from which the poly-N,N-ethylene urea was prepared. Thus, when the N,N-ethylene urea groups are derived from 1,2-alkylene imines and aliphatic or hydroaromatic isocyanates such as ethylene diisocyanate or 1,6-cyclohexane diisocyanate, it is necessary to heat the poly-N,N-ethylene urea for about two hours to a temperature of about 200° C. in order to convert it to a cross-linked plastic. On the other hand, if the poly-N,N-ethylene urea is based on an aromatic polyisocyanate it may be converted to a cross-linked plastic by heating it for a short time, for example for about 15 minutes, at a temperature above about 100° C. and preferably above about 120° C.

For the conversion of the poly-N,N-ethylene ureas to the cross-linked nitrogenous plastics of the invention it is often advantageous to mix them with an acid anhydride and preferably a carboxylic acid anhydride such as, for example, phthalic anhydride, succinic anhydride, unsaturated anhydrides obtained by diene synthesis from maleic anhydride and dienes or the saturated reduction products obtained therefrom by the addition of hydrogen such as, for example, butadiene, 1-chlorobutadiene, 1-methyl butadiene, 1-phenyl butadiene as well as other alkylated, aralkylated or chlorinated butadienes, cyclopentadiene and esters of sorbic or muconic acid. Moreover, the Δ9,10-Δ11,12-octadiene monocarboxylic acid obtained by the dehydration of ricinoleic acid, the elaostearic acid of Chinese wood oil, licanic acid of oiticia oil and the like may also be used in the diene synthesis with maleic anhydride. Other acid anhydrides include copolymers which are obtained by the polymerization of maleic anhydrides with other olefinic components which contain several 1,2-substituted succinic anhydride configurations in the molecule. The amount of the polycarboxylic acid anhydrides which are used in conjunction with the poly-N,N-ethylene urea may be as little as about 1 percent by weight based on the weight of poly-N,N-ethylene urea and it is preferred to use less than about 50 percent by weight of said polycarboxylic acid anhydride. When the polycarboxylic acid anhydrides are used to improve the cross-linking reaction, thin layers of nitrogenous plastics may be obtained at room temperature by allowing the reaction mixture to cure on a substrate for several hours.

The resulting nitrogenous plastics are substantially insoluble in organic solvents. It is possible in accordance with the process set forth above to produce substantially nonporous nitrogenous plastics as well as cellular products and coatings. For the production of substantially nonporous materials the poly-N,N-ethylene urea is poured into a mold and heated to a temperature preferably above about 100° C. either alone or in conjunction with the aforementioned polycarboxylic acid anhydrides. For the preparation of cellular plastics, it is necessary to include a volatile component in the reaction mixture which will lead to the production of a cellular plastic such as, for example, the halohydrocarbons such as trichlorofluoromethane and the like.

In accordance with a preferred embodiment of the invention an inert organic solvent solution of the poly-N,N-ethylene ureas is prepared and applied to a textile such as synthetic fabrics such as, polyacrylonitrile, polyethylene, terephthalates or polyamide fabrics such as nylon as well as polyester fibers and natural fibers such as cotton, wool and the like. Coating compositions based on the poly-N,N-ethylene ureas will impart an antistatic property to the coated fabric. Furthermore, the coating is resistant to repeated washing and will remain on the fabric for substantially the life of the fabric. In accordance with this process an aqueous liquor of the poly-N,N-ethylene ureas is prepared and the fabric is immersed in the aqueous solution preferably at a temperature below about 50° C. and then the saturated fabric is dried at a temperature above about 100° C. to bring about cross linking of the poly-N,N-ethylene urea and produce a coated fabric. Best results are obtained when the fabric is immersed in a solution of the poly-N,N-ethylene urea at a temperature below about 10° C. and then dried at a temperature above about 110° C. to produce a coating on the fabric.

The products of the invention are useful for the production of cast articles such as, for example, bearings, gear wheels and the like especially where the resulting article will be subject to attack by organic solvents. The cellular plastics may be used for both thermal and sound insulation and the solutions of the poly-N,N-ethylene ureas may be used for coatings and/or adhesives.

The invention is further illustrated by the following examples in which the parts are by weight unless otherwise indicated.

Example 1

About 320 parts of a linear polypropylene glycol ether with an hydroxyl number of about 350 are heated with about 348 parts of toluylene diisocyanate containing the 2,4- and 2,6-isomers in the ratio 65:35 for about 30 minutes at about 105° C. to about 110° C. while stirring. After cooling the reaction mixture, which has an —NCO content of about 12.1 percent, this is diluted with about 286 parts of acetone and a solution of about 83 parts of ethylene imine and about 35 parts of acetone is added dropwise. The speed of the dropwise addition is so regulated that the temperature of the reaction mixture is between about 15° C. to about 20° C. There is obtained a yellowish clear solution with a viscosity of about 370 cp./25° C.

This solution is applied in a thin layer to a support consisting of glass or sheet iron and, after the acetone has evaporated, is heated for about 15 minutes to about 160° C. A film is obtained which adheres firmly to the supports and which is insoluble in organic solvents, the said film also not breaking under very strong bending stresses. Similar results are produced if pure toluylene-2,4-diisocyanate is used instead of the toluylene diisocyanate referred to above.

Example 2

(a) About 400 parts of 4,4'-diphenylmethane diisocyanate in about 308 parts of ethylene glycol monoethylether acetate is added to about 320 parts of a linear polypropylene ether glycol having an hydroxyl number of about 350. The reaction mixture is heated to a temperature of about 100° C. with stirring for about 75 minutes at which time the percentage of free —NCO is about 4.7 percent. The reaction mixture is then cooled to about 15° to about 20° C. and a quantity of ethylene imine corresponding to the free —NCO content (about 43 parts of the ethylene imine for each 42 parts of —NCO) is then added dropwise while stirring and maintaining the temperature below about 20° C. A clear yellow solution is obtained which has a viscosity of about 10960 cp./25° C. The solution is then applied to an iron support after the solvent has been evaporated by heating the substrate to a temperature of about 160° C. for about 30 minutes. A flexible film which has good pencil hardness, good adhesion and which withstands strong bending stresses is obtained.

(b) Following the procedure of Example 2(a) except that about 336 parts of hexamethylene diisocyanate is used in place of the 4,4'-diphenylmethane diisocyanate and about 282 parts of ethylene glycol monoethylether acetate while increasing the reaction time to about 190 minutes and increasing the temperature to about 110° C., a urethane polymer having about 8.5 percent free —NCO is obtained. On reaction with the ethylene imine, a solution which solidifies at room temperature but remains liquid after being heated again is obtained which has a viscosity of about 880 cp./25° C. In this example, the temperature at which the coated iron substrate is heated is increased to about 200° to about 210° C. A film is obtained on the substrate which is free from bubbles even in relatively thick layers which has good adhesion, very good flow properties and is highly elastic.

(c) Following the procedure of Example 2(a) except that about 320 parts of m-phenyl diisocyanate is used together with about 274 parts of the glycol ether acetate while decreasing the reaction time to about 60 minutes, a urethane polymer is obtained which has about 8.9 parts free —NCO. On reaction with the ethylene imine a clear yellow solution is obtained which has a viscosity of about 7820 cp./25° C. The film is similar to the one obtained in Example 2(a).

(d) Following the procedure of Example 2(a) except that about 488 parts of 1,3-diisopropyl-benzene-4,6-diisocyanate is used with about 346 parts of the glycol ether acetate while increasing the reaction time to about 180 minutes, a urethane polymer which has 6.8 percent —NCO is obtained. On reaction with the ethylene imine a solution which solidifies to an opaque paste is obtained which will become liquid again when heated. A hard brittle film is obtained which shows hair line cracks on bending and has moderate adhesion.

(e) Following the procedure of Example 2(a) except that about 402 parts 1-methyl-3,5-diethyl-2,4-benzene diisocyanate is used together with 310 parts of the glycol ether acetate while increasing the reaction time to about 240 minutes, a urethane polymer having about 6 percent —NCO is obtained. On reaction of this urethane polymer with ethylene imine, a solution is obtained which solidifies after a few days to a clear gel. The film obtained from this product is similar to the film obtained in Example 2(a).

*Example 3*

About 600 parts of anhydrous linear polyethylene glycol ether with an —OH number of about 187 are heated for about 8 hours at about 65° C. with about 1.5 ml. of benzoyl chloride, about 348 parts of toluylene-2,4-diisocyanate and about 315 parts of acetone, the —NCO content falling from initially 13.3 percent to 6.7 percent.

This reaction product now has added thereto about 87 parts of ethylene imine in about 29 parts of acetone while stirring so that the temperature of the reaction mixture remains between about 15° C. and about 20° C. The reaction product obtained in this way is soluble in water. Applied in a thin layer to a support, and after evaporation of the acetone, heating to about 150° C. for about 30 minutes produces a film which is insoluble in organic solvents and swellable in water.

*Example 4*

About 311 parts of castor oil are dissolved in about 208 parts of ethylene glycol methyl ether acetate, mixed with about 174 parts of toluylene diisocyanate, isomer ratio of toluylene-2,4-diisocyanate to toluylene-2,6-diisocyanate 65:35, and heated at a temperature of about 100° C. to about 110° C. until the —NCO content is about 6.0 percent. A solution of about 43 parts of ethylene imine in about 18 parts of glycol monomethyl ether acetate is now added dropwise to the cooled reaction mixture at a speed such that the temperature of the reaction mixture remains in the range from about 15° C. to about 20° C. In this way, there is obtained a creamy reaction product which is cloudy at room temperature and which becomes liquid again and clearly transparent on heating. Applied in a thin layer to an iron sheet and heated for about 30 minutes to about 180° C., a very flexible practically colorless film is obtained which is insoluble in organic solvents, shows excellent adhesion to the iorn plate and is insensitive to strong bending stresses.

*Example 5*

About 500 parts of an addition product of propylene oxide and trimethylol propane with an hydroxyl number of about 219 are dissolved in about 360 parts of ethylene glycol monomethyl ether acetate, mixed with about 340 parts of toluylene-2,4-diisocyanate and heated at about 100° C. to about 110° C. until an —NCO content of about 6.8 percent is reached. After cooling, the reaction mixture has added dropwise thereto and while stirring about 83 parts of ethylene imine in about 35 parts of ethylene glycol monomethyl ester acetate, a temperature of about 15° C. to about 20° C. being maintained. The yellowish colored clear reaction product has a viscosity of about 1980 cp./25° C.

Using a dilute solution of this reaction product, soda-cellulose paper is impregnated by dipping, the solvent is evaporated and then three layers of the prepared paper are heated at about 170° C. for about 10 minutes under a press. A laminated material is obtained which is formed by the intimate bonding of the three layers of paper. Its surface is extremely resistant to scratching and insensitive to all organic solvents.

*Example 6*

About 400 parts of a propoxylated 4,4'-dihydroxydiphenyl dimethylmethane with an acid number of about 1.3 and an hydroxyl number of about 315 are dissolved in about 532 parts of ethylene glycol monomethyl ether acetate, mixed with about 400 parts of toluylene diisocyanate, isomer ratio between 2,4- and 2,6-diisocyanate 65:35, and heated for about 95 minutes at about 90° C. The —NCO content of the reaction mixture is then about 7 percent. After cooling to about 20° C. a solution of about 95 parts of ethylene imine in about 63 parts of ethylene glycol monomethyl ether acetate is added while stirring, and the temperature is kept at about 20° C. by cooling. The reaction product obtained in this way has a viscosity of about 7040 cp./25° C. If this 60 percent solution is applied in a thin layer to a support and if it is heated for about 30 minutes at about 160° C. after evaporating the solvent, a hard, very tough and flexible film is obtained which is insoluble in organic solvents.

Similar results are produced if a tetrapropoxylated 4,4'-dihydroxydiphenyl dimethylmethane with an acid number of about 0.4 and an hydroxyl number of about 247 is reacted with toluylene diisocyanate in an —NCO/—OH ratio of about 2.0 and the resulting reaction product containing —NCO groups is caused to react with ethylene imine. The films which can be produced from such a combination by stoving are more elastic than those referred to above.

*Example 7*

About 100 parts of a linear polybutylene glycol ether with an —OH number of about 193 are dissolved in about 68 parts of ethylene glycol monomethyl ether acetate, mixed with about 60 parts of toluylene diisocyanate (ratio between 2,4- and 2,6-diisocyanates 65:35), and about 0.025 ml. of benzoyl chloride and heated for about 45 minutes to about 90° C. while stirring. The —NCO content of the reaction mixture is then about 5.8 percent. At a temperature of about 15° C. to about 30° C., about 13.5 parts of ethylene imine in about 6 parts of ethylene glycol monomethyl ether acetate are slowly added.

In this way, there is obtained a yellowish solution with a viscosity of about 7910 cp./25° C. If this solution is applied in a thin layer to a support, then after evaporating the solvent and after heating for about 30 minutes to about 160° C., there is obtained a flexible film which adheres to the support and which has particularly good running properties.

*Example 8*

Triethylene glycol, toluylene diisocyanate (isomer ratio between 2,4- and 2,6-diisocyanates 80:20) and glycol monomethyl ether acetate as solvent are supplied in the quantities indicated in Table I and reacted with one another under the reaction conditions which are also indicated.

TABLE I

| | Parts Triethylene glycol | Parts Toluylene diisocyanate | Parts Ethylene glycol mono methyl ether acetate | Reaction Conditions | | |
| --- | --- | --- | --- | --- | --- | --- |
| | | | | Time, Min. | Temp., ° C. | Percent —NCO in solution |
| a | 100 | 174 | 183 | 70 | 100 | 5.3 |
| b | 100 | 155 | 169 | 70 | 80 | 4.2 |
| c | 150 | 348 | 332 | 40 | 75 | 9.7 |

The isocyanate-containing intermediate products are then reacted at about 15° C. to about 20° C. with approximately 60 percent ethylene imine solutions in ethylene glycol monomethyl ether acetate. The quantities of ethylene imine are such that about 43 parts of ethylene imine are reacted to about 42 parts of —NCO. In this way, there are obtained poly-N,N-ethylene urea solutions with viscosities of about 3390, about 1840 and about 765 cp./25° C. in the sequence of the experiments a to c.

These solutions are applied to supports in thin layers and after evaporation of the solvent and after heating to about

Example 9

About 143 parts of octadec-1,10-ene-1,2-diol are dissolved in about 115 parts of ethylene glycol monomethyl ether acetate, mixed with about 126 parts of hexamethylene diisocyanate and heated for about 2 hours at about 110° C. After this time, the reaction mixture has an —NCO content of about 5.26 percent. About 20 parts of ethylene imine in about 9 parts of ethylene glycol monomethyl ether acetate are now added dropwise to the isocyanate-containing intermediate product, the temperature being kept at about 15° C. to about 20° C. by cooling. If the solution is applied in a thin layer to a support, then after evaporation of the solvent and heating for about 30 minutes to about 210° C., there is obtained an elastic film feeling very much like rubber, which film is insoluble in organic solvents.

Example 10

About 230 parts of 1,3-xylene-2,4,6-triisocyanate are dissolved in about 145 parts of ethylene glycol monomethyl ether acetate, mixed with about 108 parts of benzyl alcohol and heated for about 30 minutes to about 70° C. while stirring. After this time, the reaction mixture has an —NCO content of about 14.8 percent. About 73 parts of ethylene imine in about 31 parts of glycol monomethyl ether acetate are added dropwise and while constantly stirring to the isocyanate-containing intermediate product, the temperature being kept at about 15° C. to about 20° C. by cooling the reaction vessel. After completing the addition, there is obtained a mass which is solid at room temperature and which on heating to about 160° C., after previously removing the solvent, solidifies in a hard brittle resin. This resin is insoluble in the conventional organic solvents. If the poly-N,N-ethylene urea is applied in a thin layer to a support and is then heated for about 30 minutes at about 160° C., there is produced a transparent porous lacquor film which breaks when the support is bent.

Example 11

About 456 parts of 4,4'-dihydroxyphenyl methyl methane are dissolved in about 651 parts of ethylene glycol monomethyl ether acetate, mixed with about 522 parts of toluylene-2,4-diisocyanate and heated for about 6 hours at about 150° C. to about 160° C. The —NCO content of the mixture after this time is about 5.0 percent. The reaction mixture is now adjusted to approximately 50 percent solid substance by adding ethylene glycol monomethyl ether acetate and has added dropwise thereto approximately a 50 percent solution of ethylene imine in ethylene glycol monomethyl ester acetate, the temperature being kept at about 15° C. to about 20° C. by cooling. Lacquer coatings applied with this solution to flat structures solidify after evaporating the solvent and after being heated to about 160° C. for about 30 minutes, provide transparent brittle films which break when subjected to bending stresses. The films are not destroyed by heating to temperatures of about 200° C. to about 250° C., although they undergo a brown discoloration.

Example 12

About 180 parts of approximately a 60 percent solution in ethylene glycol monomethyl ether acetate with a content of about 19.4 parts of —NCO of a polyisocyanate of relatively high molecular weight obtained by reacting about 1 mol of trimethylol propane and about 3 mols of toluylene-2,4-diisocyanate are heated with about 14.5 parts of phenol in about 9.6 parts of ethylene glycol monomethyl ether acetate for about 3 hours at about 140° C. The —NCO content of the reaction mixture is now about 6.1 percent. While stirring and cooling, about 12.5 parts of ethylene imine in about 8 parts of ethylene glycol monomethyl ether acetate are added to this intermediate product containing isocyanate, the temperature being kept at about 15° C. to about 20° C. Lacquer coatings produced with the resulting solution of the poly-N,N-ethylene urea solidify after the solvent has evaporated into hard and brittle films which are sensitive to bending stresses.

Example 13

About 632 parts of 4,4'-dihydroxydiphenyl dimethylmethane which is hydroxyethylated at both ends are dissolved in about 770 parts of ethylene glycol monomethyl ether acetate, about 522 parts of toluylene diisocyanate with the 2,4- and 2,6-isomer ratio of 80:20 and about 0.36 ml. of benzoyl chloride are added thereto and the mixture is heated for about 2 hours at about 100° C. The reaction mixture after this time has an —NCO content of about 4.15 percent. About 82 parts of ethylene imine in about 55 parts of ethylene glycol monomethyl ether acetate are added dropwise to the solution of the resulting isocyanate-containing intermediate product while thoroughly mixing the reactants. The solution of the poly-N,N-ethylene urea has a viscosity of about 4740 cp./25° C. and it is yellowish in color. It is applied in a thin layer to flat elements and after the solvent has evaporated and after heating for about 30 minutes at about 160° C., very flexible, highly lustrous films are obtained on these elements, which films are characterized by good bonding strength and do not break under bending stresses.

Example 14

A branched polyester which an acid number of about 3.0 and an hydroxyl number of about 151 is prepared from about 584 parts of adipic acid, about 424 parts of diethylene glycol and about 143 parts of trimethylol propane with about 144 parts of water being split off. About 200 parts of this polyester are then dissolved in about 137 parts of ethylene glycol monomethyl ether acetate, about 120 parts of toluylene-2,4-diisocyanate are added thereto and the mixture is heated for about 85 minutes at about 80° C. The isocyanate-containing intermediate product which is formed in this way has an —NCO content of about 7.0 percent. A solution of about 33 parts of ethylene imine in about 14 parts of acetone is added dropwise to the said product while stirring and at temperature of about 15° C. to about 20° C. The poly-N,N-ethylene urea of higher molecular weight which is thereby formed has a viscosity of about 2670 cp./25° C. and the solution is absolutely clear. It is applied in a thin layer to a flat element and after the solvent has been evaporated and after heating to about 160° C. for about 30 minutes, there is produced a highly lustrous flexible lacquer coating on the said element, this coating being insoluble in organic solvents.

Example 15

About 67 parts of hexane-1,2,6-triol are heated with about 141 parts of stearyl isocyanate for about 3.5 hours at about 100° C. About 208 parts of ethylene glycol monomethyl ether acetate and about 174 parts of toluylene-2,4-diisocyanate are then added to the reaction product and heated again for about 5 hours at about 100° C. The isocyanate-containing intermediate product thereby obtained has an —NCO content of about 7.0 percent. For producing a poly-N,N-ethylene urea of relatively high molecular weight from this product, a solution of about 60 parts of ethylene imine in about 40 parts of ethylene glycol monomethyl ether acetate is added dropwise thereto, the temperature being kept at about 15° C. to about 20° C. In this way, there is obtained a wax-like reaction product which is opaque at room temperature and which is converted in thin layers and on heating to about 150° C. to about 160° C. into hard films which are insoluble in organic solvents.

Films having a higher degree of brittleness are produced if the stearyl isocyanate is replaced by an equivalent quanity of phenyl isocyanate.

*Example 16*

About 270 parts of trimethylol propane are heated with about 168 parts of hexamethylene diisocyanate and about 198 parts of butyl isocyanate in about 636 parts of ethylene glycol monomethyl ether acetate for about 90 minutes at about 100° C. After this time, the reaction of the isocyanate groups with the hydroxyl groups is completed, as is apparent from a determination of the —NCO content. The reaction mixture has added thereto approximately a 50 percent solution of about 348 parts of toluylene diisocyanate, with an isomer ratio between 2,4- and 2,6-diisocyanates of 80:20, in ethylene glycol monomethyl ether acetate and the mixture is heated for approximately another 2 hours at about 70° C. The —NCO content of the reaction mixture is now about 4.1 percent. For converting this isocyanate-containing intermediate product into a poly-N,N-ethylene urea, about 83 parts of ethylene imine in about 83 parts of ethylene glycol monomethyl ether acetate are added dropwise to the mixture and while stirring at a temperature of about 15° C. to about 20° C. There is obtained a slightly yellowish colored solution with a viscosity of about 573 cp./25° C. Applied in thin layers to a sheet element and after heating for about 30 minutes to about 160° C., transparent and highly lustrous films are obtained which are insensitive to bending stresses.

Films which are insoluble in organic solvents are formed after standing for about 12 to about 15 hours at room temperature if about 15 percent of hexahydrophthalic anhydride, about 14 percent of phthalic anhydride, about 9.8 percent of succinic anhydride, about 9.6 percent of maleic anhydride or about 26 percent of tetrapropylene succinic anhydride are added to the poly-N,N-ethylene urea, based on the solid substance of the latter. The quickest initial drying of the lacquer film is found with maleic anhydride, but the best thorough drying is on the other hand found with hexahydrophthalic anhydride and phthalic anhydride. Tetrapropylene succinic anhydride has the weakest action and leads to softer films.

The poly-N,N-ethylene urea solutions to which the anhydrides have been added show practically no change as regards viscosity and color, with the exception of that with maleic anhydride, which has higher viscosity and is discolored to a brownish-violet color after about 12 to about 15 hours.

*Example 17*

About 480 parts of a linear polypropylene glycol ether with an hydroxyl number of about 350 are dissolved in about 394 parts of ethylene glycol monomethyl ether acetate, about 440 parts of hexamethylene diisocyanate are added thereto and the mixture is heated for about 140 minute at about 120° C. The isocyanate containing intermediate products obtained in this way has an —NCO value of about 6.7 percent. In order to convert this product into the poly-N,N-ethylene urea, a solution of about 90 parts of ethylene imine in about 39 parts of ethylene glycol monomethyl ether acetate is added thereto at about 15° C. to about 20° C. while stirring. The viscosity of the mixture is now about 470 cp./25° C. Lacquer coatings on surfaces are obtained from this combination by heating the coatings for about 30 minutes at about 200 to about 210° C. The films are very elastic and have a rubber-like feel. At room temperature, films which are insoluble in organic solvents are obtained in about 15 hours if the solutions of the poly-N,N-ethylene urea have added thereto about 15 percent of hexahydrophthalic anhydride, about 1.4 percent of phthalic anhydride, about 9.8 percent of succinic anhydride, about 9.6 percent of maleic anhydride or about 26 percent of tetrapropenyl succinic anhydride, all those quantities being calculated on the solid substance of the poly-N,N-ethylene urea.

The first four batches already show initial drying after about 2 hours. The best complete drying after about 15 hours is observed with the first three batches. After the same time, the lacquer solutions show practically no changes in viscosity, with the exception of that containing maleic anhydride, which is discolored a violet-brown color and is at the same time swelled.

If the ethylene glycol monomethyl ether acetate is removed from the solution of the poly-N,N-ethylene urea by distilling off in vacuo, and if the residue is heated for about 1 hour at about 200° C., a cross-linked, amber-colored semi-elastic plastic is obtained.

*Example 18*

About 660 parts of dehydrated polyethylene glycol with the molecular weight about 660 are added dropwise within about 2 hours at about 45° C. to about 348 parts of a mixture of 65 percent toluylene-2,4-diisocyanate and 35 percent toluylene-2,6-diisocyanate dissolved in about 700 cc. of acetone and thereafter kept at this temperature for approximately another 3 hours. After the reaction mixture has stood overnight, initially about 15 parts of pyridine and thereafter about 86 parts of ethylene imine are incorporated by stirring while cooling with ice at about 20° C. to about 40° C. The reaction mixture forms a clear light yellow liquid.

For the antistatic finishing of a textile fabric consisting of synthetic fibers (polyacrylonitrile, polyethylene, terephthalate or polyamine such as perlon or nylon) the said fabric is treated on a padding machine with a liquor containing about 50 parts of the previously described acetone solution in about 1 liter of water at a temperature of about 3° C. to about 7° C. and the fabric is heated for about 10 minutes at about 120° C. after being quickly dried. The fabric thus treated has a full handle and its antistatic finish is still very resistant, even after being washed several times. Similar effects are obtained if the aforesaid fabric is treated with a liquor containing, per liter, about 15 parts of the previously described product as well as about 8 parts of the sulphuric acid ester of oleyl alcohol.

*Example 19*

About 1150 parts of hydroxyethylated butane-1,4-diol with a molecular weight of about 2300 and at a temperature of about 45° C. is added dropwise within about 3 hours at about 40° C. to about 174 parts of toluylene-2,4-diisocyanate, about 700 parts of acetone and about 2 parts of benzoyl chloride and the mixture is thereafter stirred for about 4 hours at about 40° C.

It is then left to stand overnight and then, while cooling with ice, initially about 15 parts of pyridine and thereafter about 45 parts of ethylene imine are incorporated by stirring at about 20° C. to about 40° C. while cooling with ice. After stirring about 2 hours, a thinly liquid solution is obtained which is miscible in any proportion with water. Concentrated aqueous solutions of this product can be gelled by boiling.

If a fabric of polyacrylonitrile, viscous or staple fiber is treated on the padding machine with an aqueous liquor containing, per liter, about 40 parts of the previously described solution as well as about 2 parts of a pigment which is dispersed in known manner with a polyethylene oxide derivative and if the fabric is heated after drying for about 20 minutes at about 115° C., the fabric has a coloring which is very resistant to washing and, in the case of the synthetic fibers, the formation of an electric charge is prevented. As color pigments, Pigment Red 5 C.I. 12490 (Color Index, second edition, 1956), iron oxide pigments and carbon black are used.

*Example 20*

About 281 parts of dehydrated hydroxyethylated triethanolamine with an hydroxyl number of about 99.5 and a molecular weight of about 1690 are added dropwise to about 87 parts of toluylene-2,4-diisocyanate and about 1 part of benzoyl chloride in the course of about 1 hour and while stirring vigorously at about 45° C. After the reaction mixture has stood overnight, about 21.5 parts of ethylene imine are added so quickly that the reaction temperature does not rise above about 40° C. The reaction product forms a thickly liquid, light yellow oil which has good solubility in water.

If a fabric of polyacrylonitrile, polyester fibers or polyamide fibers is treated on the padding machine with an aqueous liquor containing, per liter, about 10 parts of the previously described polyethylene urea and if the fabric is heated for about 5 minutes at about 130° C., there is obtained an antistatically finished fabric, the finish of which is not reduced by washing several times with soaps or synthetic detergents.

Example 21

About 205 parts of dehydrated hydroxyethylated triethanolamine (hydroxyl number about 137, corresponding to a molecular weight of about 1230) are added dropwise to about 87 parts of toluylene-2,4-diisocyanate, about 290 parts of acetone and about 1 part of benzoyl chloride in the course of about 1 hour and while vigorously stirring at about 45° C. The mixture is then stirred for about 4 hours at about 45° C., left to stand for about 15 hours at room temperature and then about 21.5 parts of ethylene imine are incorporated by stirring within about 1 hour at about 20° C. For finishing purposes, a fabric of polyacrylonitrile or polyamide fibers is treated on the padding machine with an aqueous liquor containing, per liter, 50 parts of the previously described solution and about 6 parts of cetyl dimethyl benzyl ammonium chloride and, after being quickly dried, is heated for about 10 minutes at about 120° C. The good antistatic finish of this fabric is resistant to washing.

It is to be understood that any other suitable poly-N,N-ethylene urea or urethane and/or urea precursor thereof or any other suitable component in accordance with the preceding disclosure could have been used in the working examples.

Although the invention has been described in considerable detail in the foregoing, it is to be understood that such detail is solely for the purpose of illustration and that many variations can be made by those skilled in the art without departing from the spirit and scope of the invention except as set forth in the claim.

What is claimed is:

A poly-N,N-ethylene urea plastic obtained by a process which comprises reacting in a first step a member selected from the group consisting of urethanes andureas having at least two free —NCO groups per molecule and an —NCO content of from about 6.7 to about 21.1%, with a 1,2-alkylene imine at a temperature below about 50° C. and reacting the product of the first step in a second step with an acid anhydride at a temperature of from about 100° C. to about 250° C. until a cross-linked plastic is obtained.

References Cited by the Examiner

UNITED STATES PATENTS

| | | | |
|---|---|---|---|
| 2,917,486 | 12/1959 | Nelson | 260—77.5 |
| 2,929,800 | 3/1960 | Hill | 260—77.5 |
| 3,054,757 | 9/1962 | Britain | 260—2.5 |

LEON J. BERCOVITZ, *Primary Examiner.*

MILTON STERMAN, HAROLD N. BURSTEIN,
*Examiners.*

J. E. MUETH, J. J. KLOCKO, *Assistant Examiners.*